(12) United States Patent
Oh

(10) Patent No.: US 8,117,473 B2
(45) Date of Patent: Feb. 14, 2012

(54) NOISE REDUCTION BY RETURNING TO NORMAL MODE UPON ABOVE THRESHOLD USAGE WHILE PERIODICALLY CHANGING BETWEEN SLEEP MODE AND LOW FREQUENCY MODE

(75) Inventor: Jang-Geun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 575 days.

(21) Appl. No.: 12/265,504

(22) Filed: Nov. 5, 2008

(65) Prior Publication Data
US 2009/0313491 A1    Dec. 17, 2009

(30) Foreign Application Priority Data
Jun. 16, 2008 (KR) .................. 10-2008-0056525

(51) Int. Cl.
*G06F 1/32* (2006.01)
(52) U.S. Cl. ........................ 713/322; 713/323
(58) Field of Classification Search .................. None
See application file for complete search history.

(56) References Cited

U.S. PATENT DOCUMENTS

| | | | | |
|---|---|---|---|---|
| 6,130,602 A | * | 10/2000 | O'Toole et al. | 340/10.33 |
| 6,823,516 B1 | | 11/2004 | Cooper | |
| 7,167,992 B2 | * | 1/2007 | Katoh et al. | 713/320 |
| 7,398,406 B2 | * | 7/2008 | Naruse et al. | 713/322 |
| 2004/0215989 A1 | | 10/2004 | Kawano et al. | |
| 2006/0030353 A1 | * | 2/2006 | Jun | 455/550.1 |
| 2006/0047986 A1 | | 3/2006 | Kurts et al. | |
| 2006/0132109 A1 | | 6/2006 | Rodriguez et al. | |
| 2007/0157036 A1 | | 7/2007 | Jahagirdar et al. | |

FOREIGN PATENT DOCUMENTS

CN          101084480 A          12/2007

* cited by examiner

*Primary Examiner* — Kenneth Kim
(74) *Attorney, Agent, or Firm* — Birch, Stewart, Kolasch & Birch, LLP (57) ABSTRACT

A noise reduction apparatus and method of a processor to which a dynamic power management technique is applied. The noise reduction apparatus includes a mode setting unit for detecting a use state of a processor and setting an operation mode; and a power supply unit for supplying voltage corresponding to the operation mode set by the mode setting unit. The operation mode includes a general mode in which the processor normally operates; a sleep mode in which activity of the processor is suspended; and a low frequency mode in which the processor operates at voltage and clock frequency lower than those of the general mode and higher than those of the sleep mode. The mode setting unit changes between the general mode and the sleep mode, wherein the processor is set to the low frequency mode as an intermediate step.

8 Claims, 7 Drawing Sheets

NOISE REDUCTION BY RETURNING TO NORMAL MODE UPON ABOVE THRESHOLD USAGE WHILE PERIODICALLY CHANGING BETWEEN SLEEP MODE AND LOW FREQUENCY MODE

CROSS REFERENCE TO RELATED APPLICATIONS

The present application is related to and claims priority to Korean patent application 10-2008-0056525, filed on Jun. 16, 2008, the entire contents of which being hereby incorporated by reference.

BACKGROUND OF THE INVENTION

1. Field of the Invention

The present invention relates to a noise reduction apparatus and method.

2. Description of the Related Art

Since power consumption is generally proportional to a square of applied power voltage, dropping the power voltage may be an effective method of reducing the power consumption. Accordingly, a dynamic voltage scaling (DVS) technique has been developed to dynamically reduce power voltage of a CPU in a computer system.

In the meantime, power management of an operating system is performed based on, for example, the Advanced Configuration and Power Interface (ACPI) power management specification in recent mobile PC environments.

According to the power management specification, operation modes of a CPU are defined as C0, C1, C2, C3, C4, C5, and C6 states in order to efficiently utilize power that is used in a system. Here, the C0 state is a normal state, and the C2 state is a step in which the CPU performs a minimum activity such as snooping operation in order to maintain associativity of cache. The C3 state is a state in which an external clock is not provided to the CPU, and all activities except a function for maintaining data stored in a cache memory within the CPU are suspended. In addition, the C4 and C6 states are power states that minimize power consumption by lowering voltage supplied to the CPU.

SUMMARY OF THE INVENTION

An object of the present invention is to provide a noise reduction apparatus and method of a dynamic power management processor, wherein noise generated by a capacitor resonance phenomenon of a DC/DC converter, which is a power input terminal, can be reduced in C4 or C6 power state.

Another object of the present invention is to provide a noise reduction apparatus and method of a dynamic power management processor, which can solve the problems of increase in manufacturing cost and enlargement of a computer occurring when a capacitor of a power input terminal of a CPU core is replaced with a Tantal capacitor.

According to an aspect of the present invention for achieving the objects, there is provided a noise reduction apparatus of a dynamic power management processor, which comprises a mode setting unit for detecting a use state of a processor and setting an operation mode; and a power supply unit for supplying voltage corresponding to the operation mode set by the mode setting unit, wherein the operation mode includes a general mode in which the processor normally operates; a sleep mode in which activity of the processor is suspended; and a low frequency mode in which the processor operates at voltage and clock frequency lower than those of the general mode and higher than those of the sleep mode; and the mode setting unit performs a change between the general mode and the sleep mode, the change including a step of setting the operation mode of the processor to the low frequency mode as an intermediate step.

At this time, the low frequency mode may include a low speed mode in which the processor virtualizes a bus signal and operates at clock frequency and bus frequency lower than those of the general mode, and an ultra low speed mode in which the processor operates at voltage and clock frequency lower than those of the low speed mode; wherein the mode setting unit performs the change between the general mode and the sleep mode, the change including a step of sequentially setting the operation mode of the processor to the low speed mode and the ultra low speed mode as an intermediate step.

In addition, the ultra low speed mode may be an operation mode, in which a clock signal is received from a phase locked loop (PLL) whereby operation voltage and clock frequency of the processor are set to be lower than those of the low speed mode.

Further, the ultra low speed mode may be an operation mode, in which the bus signal is virtualized whereby operation voltage and clock frequency of the processor are set to be lower than those of the low speed mode.

At this time, when the change between the general mode and the sleep mode occurs by a periodically generated event, the mode setting unit may set the operation mode of the processor to the low frequency mode as an intermediate step of the change.

In addition, when a periodic exit event occurs in a sleep mode, the mode setting unit may change the operation mode of the processor to a low frequency mode in response to the generation of the event signal.

In the meantime, the present invention provides a noise reduction method of a dynamic power management processor, which comprises the steps of (a) detecting a use state of a processor and setting an operation mode; and (b) supplying voltage and clock frequency corresponding to the set operation mode, wherein the operation mode includes a general mode in which the processor normally operates; a sleep mode in which activity of the processor is suspended; and a low frequency mode in which the processor operates at voltage and clock frequency lower than those of the general mode and higher than those of the sleep mode; and the mode setting unit performs a change between the general mode and the sleep mode, the change including a step of setting the operation mode of the processor to the low frequency mode as an intermediate step.

At this time, the low frequency mode may include a low speed mode in which the processor virtualizes a bus signal and operates at clock frequency and bus frequency lower than those of the general mode, and an ultra low speed mode in which the processor operates at voltage and clock frequency lower than those of the low speed mode; and step (a) performs the change between the general mode and the sleep mode, the change including a step of sequentially setting the operation mode of the processor to the low speed mode and the ultra low speed mode as an intermediate step.

In addition, the ultra low speed mode may be an operation mode, in which a clock signal is received from a PLL whereby operation voltage and clock frequency of the processor are set to be lower than those of the low speed mode.

Further, the ultra low speed mode may be an operation mode, in which the bus signal is virtualized whereby operation voltage and clock frequency of the processor are set to be lower than those of the low speed mode.

At this time, when the change between the general mode and the sleep mode occurs by a periodically generated event, step (a) may be performed to set the operation mode of the processor to the low frequency mode as an intermediate step of the change.

In addition, when a periodic exit event occurs in a sleep mode, step (a) may be performed to change the operation mode of the processor to a low frequency mode in response to the generation of the event signal.

DESCRIPTION OF THE PREFERRED EMBODIMENT

Hereinafter, preferred embodiments of a noise reduction apparatus of a dynamic power management processor according to the present invention will be described in detail with reference to the accompanying drawings.

Figure 1:
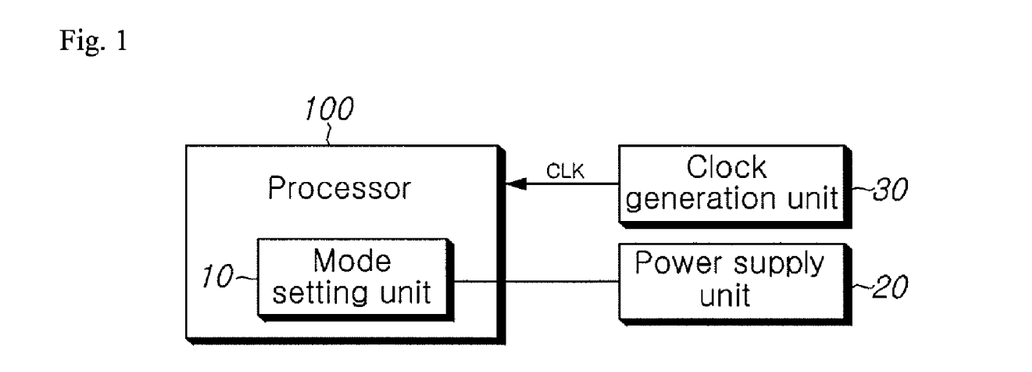
FIG. 1 is a block diagram showing a noise reduction apparatus of a dynamic power management processor of a specific embodiment of the present invention.

FIG. 1 is a block diagram showing a noise reduction apparatus of a dynamic power management processor of a specific embodiment of the present invention.

As shown in FIG. 1, the noise reduction apparatus of a dynamic power management processor according to the specific embodiment of the present invention comprises a processor 100.

The processor 100 receives power from a power supply unit 20 and clock (CLK) signals from a clock generation unit 30, which will be described below. The processor 100 communicates with a graphic controller (not shown), a main memory (not shown), and a southbridge (not shown) through a northbridge (not shown).

In the meantime, the southbridge (not shown) connects peripheral devices (not shown), a storage apparatus (not shown), an audio apparatus (not shown), a video apparatus (not shown), and the like to the northbridge (not shown).

Then, the processor 100 receives one or more clock signals from the clock generation unit 30 to be described below. At this time, the clock signals are provided through a phase locked loop (PLL) that modulates frequency.

Meanwhile, the noise reduction apparatus of a dynamic power management processor according to the specific embodiment of the present invention comprises a mode setting unit 10. Although it is shown in FIG. 1 that the mode setting unit 10 is included in the processor 100, it is not necessarily limited thereto. That is, the mode setting unit 10 may be provided as a constitutional component separate from the processor 100.

The mode setting unit 10 detects a use state of the processor 100 and sets an operation mode of the processor 100.

At this time, the operation mode includes a general mode in which the processor 100 normally operates, a sleep mode in which activity of the processor 100 is suspended, and a low frequency mode in which the processor 100 operates at voltage and clock frequency lower than those of the general mode and higher than those of the sleep mode.

For example, the operation mode of the processor 100 may include C0 to C6, C7 power states in conformance to the ACPI specification.

For example; the processor operates in the general mode when usage of the processor 100 is 50% or more and enters the low frequency mode when usage of the processor 100 is less than 50%. In addition, when the usage of the processor 100 is further lowered in the low frequency mode, the operation mode of the processor 100 is changed to the sleep mode.

In the meantime, if the usage of the processor 100 increases in the sleep mode, the processor enters the low frequency mode, and if the usage of the processor 100 further increases in the low frequency mode, the processor enters the general mode.

The general mode may be a C0 power state (normal state), in which a core of the processor 100 normally operates. At this time, the general mode may be divided into a high frequency mode (HFM) and a low frequency mode (LFM) according to clock frequency at which the processor 100 operates. The HFM and LFM are applied depending on the usage of the processor 100, i.e., the HFM is applied if the usage is high while the LFM is applied if the usage is low.

Here, the LFM is a power state in which a VID signal and the PLL are controlled to lower the clock frequency and operation voltage of the processor 100. For example, the processor can operate at a clock frequency of 1.6 GHz in the LFM.

In addition, the sleep mode may be the C6 power state (deep power down state) or the C7 power state to be applied later, in which, core voltage is lowered to a level further lower than the core voltage of a level at which the state of the core is stored and maintained in the C4 power state (deeper sleep state) or the C5 (enhanced deeper sleep) power state, in which the core of the processor 100 flushes contents of an L1 cache to L2 cache, a state of the core is stored, the PLL is turned off, and voltage is dropped to a limit level at which contents of cache data can be maintained.

Further, the low frequency mode is divided into a low speed mode and an ultra low speed mode depending on clock frequency at which the processor 100 operates. At this time, the low speed mode is a state in which the processor 100 virtualizes a bus signal and operates at clock frequency and bus frequency lower than those of the general mode. The ultra low speed mode is a state in which the processor 100 operates at voltage and clock frequency lower than those of the low speed mode.

Here, the low speed mode is a power state in which both of the clock frequencies of the processor 100 and a front side bus (FSB) are flexibly lowered using a dynamic FSB frequency switching technique. That is, the low speed mode corresponds to a super LFM that does not change an external bus signal (BCLK) but simultaneously lowers the clock frequencies of the processor 100 and the FSB through a method of virtualizing a bus signal by lowering reference frequency of the bus signal as much as 50% of the external bus signal within the processor 100. For example, the processor can operate at a clock frequency of 0.8 GHz in the low frequency mode of the super LFM.

Also, the ultra low speed mode is a power state that lowers the clock frequency and operation voltage of the processor 100 by controlling the VID signal and the PLL or virtualizing a bus signal, or controlling the VID signal and the PLL and virtualizing the bus signal. The ultra low speed mode corresponds to an ultra LFM operating at voltage and clock frequency further lower than those of the super LFM described above. A power state of the processor in the ultra low speed mode of the ultra LFM is defined as a C0_Lo state.

A plurality of operation modes are shown in Table 1.

TABLE 1

| | State | Clock | VID Control | PLL Control |
|---|---|---|---|---|
| HFM | C0 | 2.2 GHz | Yes | Yes |
| LFM | C0 | 1.6 GHz | Yes | Yes |
| super LFM | C0 | 0.8 GHz | No | No |
| ultra LFM | C0_Lo | 0.2 GHz↓ | Yes | Yes |

In addition, the mode setting unit 10 sets the operation mode of the processor 100 to the low frequency mode as an intermediate step when performing a change between the general mode and the sleep mode.

That is, when the mode setting unit 10 detects a use state of the processor 100 and changes the operation mode of the processor 100 from the general mode to the sleep mode, the operation mode is changed from the general mode to the low frequency mode and then to the sleep mode.

This is to reduce a range of voltage variance by changing the operation mode of the processor 100 step by step in order to prevent the generation of noise at the capacitor of the power input terminal when the voltage variance according to the change in operation mode is large.

In the same manner, when the mode setting unit 10 detects a use state of the processor 100 and changes the operation mode of the processor 100 from the sleep mode to the general mode, the operation mode is changed from the sleep mode to the low frequency mode and then to the general mode.

Here, since the low frequency mode is a state operating at voltage and clock frequency lower than those of the general mode and higher than those of the sleep mode, the generation of noise can be prevented by reducing the extent of the voltage variance according to the change in operation mode.

In the meantime, the noise reduction apparatus of a dynamic power management processor according to the specific embodiment of the present invention comprises the power supply unit 20.

The power supply unit 20 supplies power corresponding to a plurality of operation modes set by the mode setting unit 10.

The power supply unit 20 supplies power of a level corresponding to each operation mode by changing the level of core voltage depending on the VID signal of the processor 100.

Meanwhile, the noise reduction apparatus of a dynamic power management processor according to the specific embodiment of the present invention comprises the clock generation unit 30.

The clock generation unit 30 generates a clock signal, and the processor 100 receives an external reference clock and changes operation frequency through an internal PLL.

Hereinafter, a noise reduction apparatus of a dynamic power management processor according to each embodiment of the present invention will be described in detail.

First, a noise reduction apparatus of a dynamic power management processor according to a first embodiment of the present invention will be described in detail.

Figure 2:
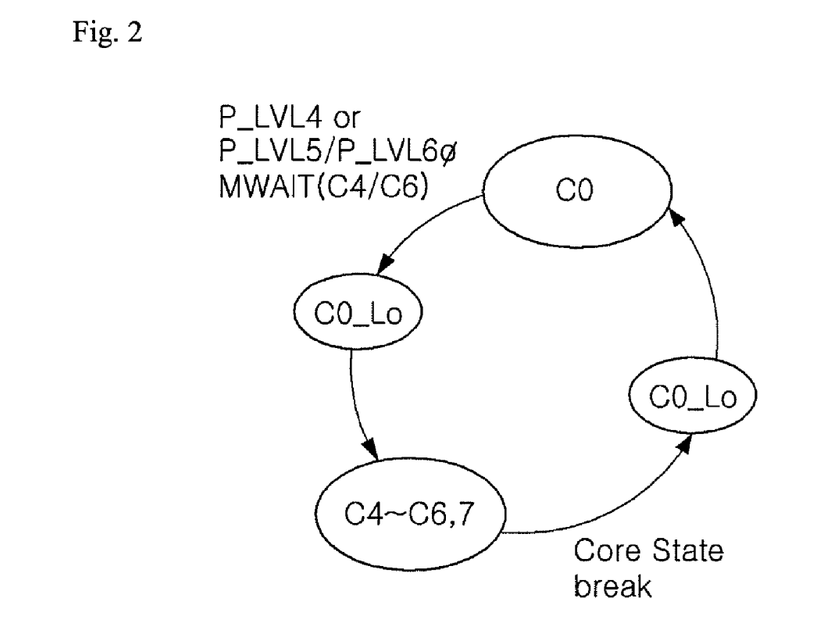
FIG. 2 is a block diagram showing a change in operation mode of a processor according to a noise reduction apparatus of a dynamic power management processor of a first embodiment of the present invention.

In performing a change between the general mode and the sleep mode, the mode setting unit 10 of the noise reduction apparatus of a dynamic power management processor according to the first embodiment of the present invention performs the change including a step of setting the operation mode of the processor 100 to the low frequency mode as an intermediate step.

Here, the low frequency mode includes the low speed mode and the ultra low speed mode as described above.

FIG. 2 is a block diagram showing a change in operation mode of a processor according to the noise reduction apparatus of a dynamic power management processor of the first embodiment of the present invention.

Referring to FIG. 2, when a signal of P_LVL4, P_LVL5/P_LVL6, or MWAIT (C4/C6) is received in the C0 power state, the mode setting unit 10 changes the operation mode of the processor 100 from the C0 power state to the C4 or C6/7 power state via the C0_Lo power state.

In addition, when the operation mode is changed from the C4 or C6/7 power state to the C0 power state by core state break, the mode setting unit 10 changes the operation mode of the processor 100 from the C4 or C6/7 power state to the C0 power state via the C0_Lo power state.

That is, when the mode setting unit 10 detects a use state of the processor 100 and changes the operation mode from the general mode to the sleep mode, the mode setting unit 10 changes the operation mode from the general mode to the sleep mode via the low frequency mode of the super or ultra LFM.

In addition, even when the operation mode is changed from the sleep mode to the general mode, the mode setting unit 10 also changes the operation mode from the sleep mode to the general mode via the low frequency mode of the super or ultra LFM.

Figure 3:
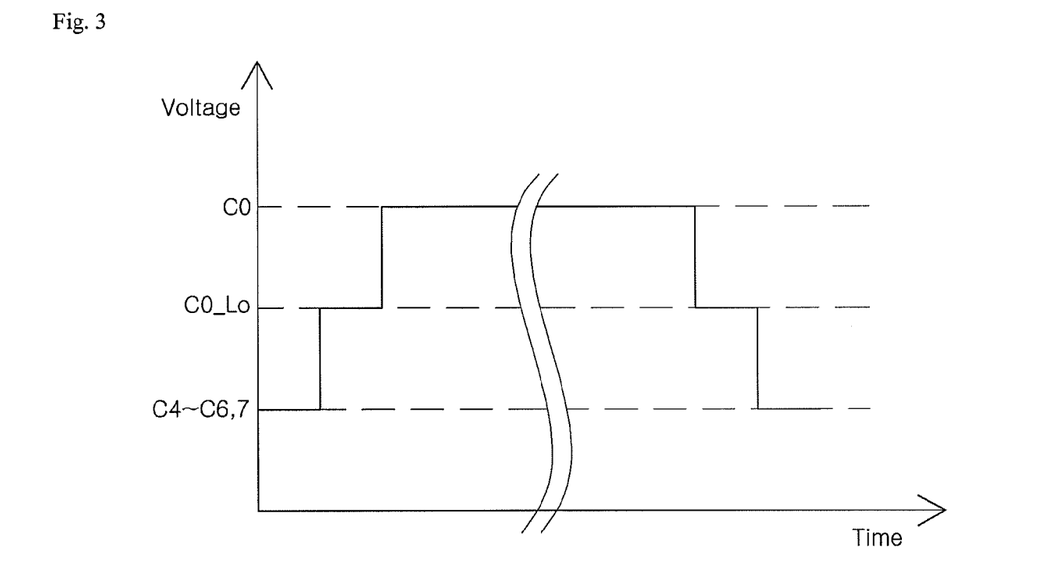
FIG. 3 is a graph showing relation of time and voltage when an operation mode of a processor is changed according to the noise reduction apparatus of a dynamic power management processor of the first embodiment of the present invention.

FIG. 3 is a graph showing relation of time and voltage when an operation mode of a processor is changed according to the noise reduction apparatus of a dynamic power management processor of the first embodiment of the present invention.

Referring to FIG. 3, the operation mode of the processor 100 is changed from the C4 or C6/7 power state to the C0 power state via the C0_Lo power state, and in the same manner, from the C0 power state to the C4 or C6/7 power state via the C0_Lo power state.

Here, since the C0_Lo power state operates at operation voltage lower than that of the C0 power state and higher than that of the C4 or C6/7 power state, the generation of noise can be prevented by reducing the extent of voltage variance according to the change in operation mode.

In the meantime, the mode setting unit 10 may set the operation mode to the low frequency mode as an intermediate step of the operation mode change of the processor 100 only when a change occurs between the general mode and the sleep mode according to an event signal periodically generated.

That is, the mode setting unit 10 may apply the low frequency mode to all cases where the operation mode of the processor 100 is changed between the general mode and the sleep mode. In addition, the operation mode of the processor 100 can be set to be changed via the low frequency mode restrictively only when the change between the general mode and the sleep mode is performed by the event signal periodically generated.

Next, a noise reduction apparatus of a dynamic power management processor according to a second embodiment of the present invention will be described in detail.

Figure 4:
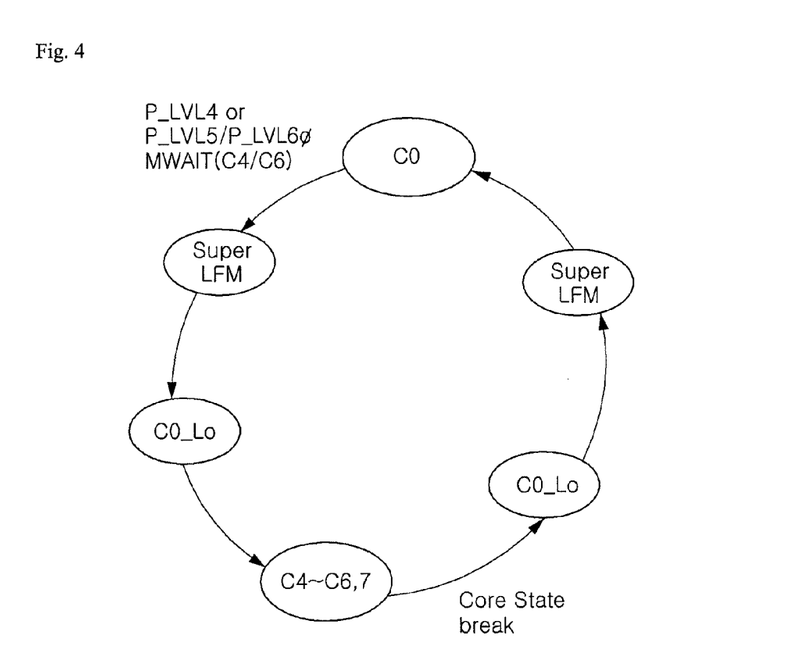
FIG. 4 is a block diagram showing a change in operation mode of a processor according to a noise reduction apparatus of a dynamic power management processor of a second embodiment of the present invention.

The mode setting unit 10 of the noise reduction apparatus of a dynamic power management processor according to the second embodiment of the present invention sequentially performs a change between the general mode and the sleep mode, including an intermediate step of setting the operation mode of the processor 100 to the low speed mode and the ultra low speed mode.

At this time, the low speed mode is a low frequency mode in which the processor 100 virtualizes a bus signal and operates at clock frequency and bus frequency lower than those of the general mode.

In addition, the ultra low speed mode is a low frequency mode in which the processor 100 operates at voltage and clock frequency lower than those of the low speed mode.

The ultra low speed mode is an operation mode, in which a clock signal is received from the PLL or a bus signal is virtualized whereby the operation voltage and clock frequency of the processor 100 are set to be lower than those of the low speed mode.

That is, the ultra low speed mode may be performed according to a first method, in which the PLL signals to reduce the output clock frequency thereby lowering the clock frequency of the processor 100 and thus causing the processor 100 to operate at low voltage.

In addition, the ultra low speed mode may also be performed according to a second method, by which both the clock frequencies of the processor 100 and the FSB are flexibly lowered simultaneously using the dynamic FSB frequency switching technique. That is, the ultra low speed mode does not change an external bus signal (BCLK), but simultaneously lowers both the clock frequencies of the processor 100 and the FSB in a method of virtualizing a bus signal by lowering reference frequency of the bus signal with respect to the external bus signal within the processor 100.

Further, the ultra low speed mode may be performed according to a method, by which the processor operates at voltage and clock frequency lower than those of the low speed mode by applying both the aforementioned first and second methods.

For example, the low speed mode and the ultra low speed mode respectively can be a low frequency mode of the super LFM or the ultra LFM. In the ultra low speed mode of the ultra LFM, the power state of the processor corresponds to the C0_Lo power state.

FIG. 4 is a block diagram showing a change in operation mode of a processor according to the noise reduction apparatus of a dynamic power management processor of the second embodiment of the present invention.

Referring to FIG. 4, when a signal of P_LVL4, P_LVL5/ P_LVL6, or MWAIT (C4/C6) is received in the C0 power state, the mode setting unit 10 changes the operation mode of the processor 100 from the C0 power state to the super LFM and then to the C4 or C6/7 power state via the C0_Lo power state.

In addition, the mode setting unit 10 changes the operation mode of the processor 100 from the C4 or C6/7 power state to the C0_Lo power state first by core state break and then to the C0 power state via the super LFM.

That is, when the mode setting unit 10 detects a use state of the processor 100 and changes the operation mode from the general mode to the sleep mode, the mode setting unit 10 changes the operation mode from the general mode to the low speed mode and then to the sleep mode via the ultra low speed mode.

In addition, even when the operation mode is changed from the sleep mode to the general mode, the mode setting unit 10 also changes the operation mode from the sleep mode to the ultra low speed mode and then to the general mode via the low speed mode.

Figure 5:
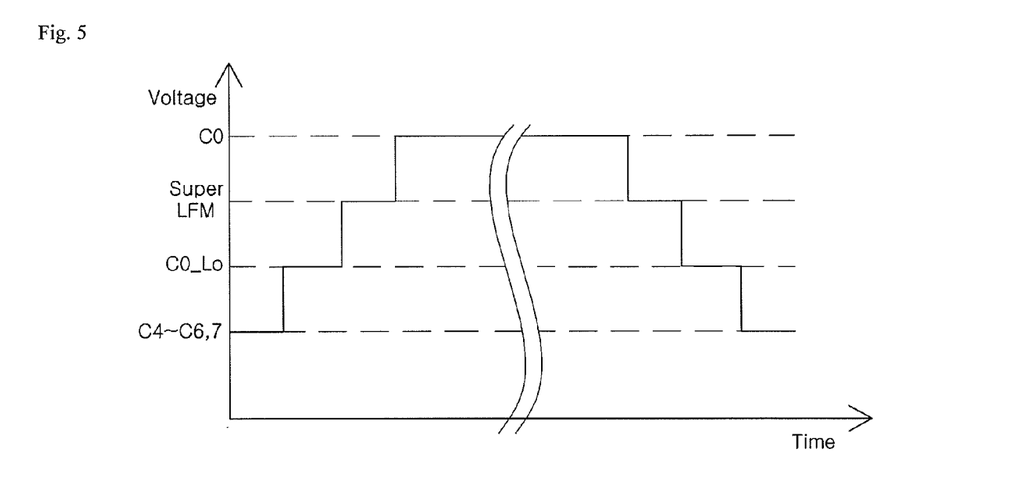
FIG. 5 is a graph showing relation of time and voltage when an operation mode of a processor is changed according to the noise reduction apparatus of a dynamic power management processor of the second embodiment of the present invention.

FIG. 5 is a graph showing relation of time and voltage when an operation mode of a processor is changed according to the noise reduction apparatus of a dynamic power management processor of the second embodiment of the present invention.

Referring to FIG. 5, the operation mode of the processor 100 is changed from the C4 or C6/7 power state to the C0 power state via the C0_Lo power state and the super LFM, and in the same manner, from the C0 power state to the C4 or C6/7 power state via the super LFM and the C0_Lo power state.

Here, since the super LFM operates at operation voltage lower than that of the C0 power state and higher than that of the C0_Lo power state, and the C0_Lo power state operates at operation voltage lower than that of the super LFM and higher than that of the C4 or C6/7 power state, the generation of noise can be prevented by reducing the extent of voltage variance according to the change in operation mode.

In the meantime, in the same manner as described above, the mode setting unit 10 may set the operation mode to the low frequency mode as an intermediate step of the operation mode change of the processor 100 only when the change occurs between the general mode and the sleep mode according to the event signal periodically generated.

That is, the mode setting unit 10 may apply the low frequency mode of the low speed mode and the ultra low speed mode to all cases where the operation mode of the processor 100 is changed between the general mode and the sleep mode. In addition, the operation mode of the processor 100 can be set to be changed via the low frequency mode of the low speed mode and the ultra low speed mode restrictively only when the change between the general mode and the sleep mode is performed by the event signal periodically generated.

Next, a noise reduction apparatus of a dynamic power management processor according to a third embodiment of the present invention will be described in detail.

Figure 6:
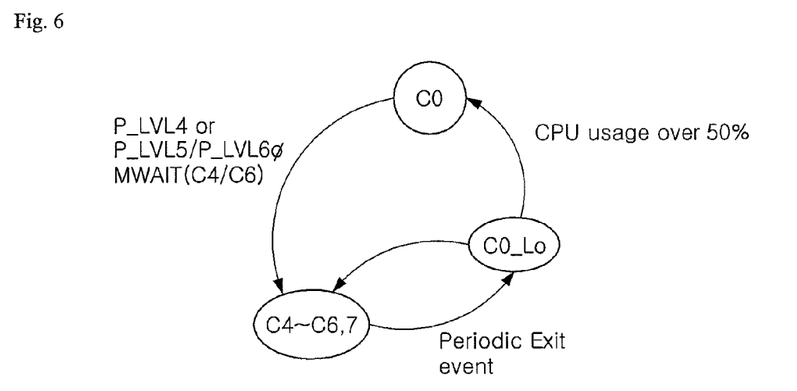
FIG. 6 is a block diagram showing a change in operation mode of a processor according to a noise reduction apparatus of a dynamic power management processor of a third embodiment of the present invention.

When a periodic exit event is generated in the sleep mode, the mode setting unit 10 of the noise reduction apparatus of a dynamic power management processor according to the third embodiment of the present invention periodically changes the operation mode of the processor 100 between the sleep mode and the low frequency mode in response to the generation of the event signal.

Here, the low frequency mode includes the super LFM and ultra LFM as described above. In addition, the periodic exit event may be generated by, for example, expiration of a timer.

FIG. 6 is a block diagram showing a change in operation mode of a processor according to the noise reduction apparatus of a dynamic power management processor of the third embodiment of the present invention.

Referring to FIG. 6, when a signal of P_LVL4, P_LVL5/P_LVL6, or MWAIT (C4/C6) is received in the C0 power state, the mode setting unit 10 changes the operation mode from the C0 power state to the C4 or C6/7 power state. In addition, if a periodic exit event is generated in the C4 or C6/7 power state, voltage and clock frequency corresponding to the C0_Lo power state and the C4 or C6/7 power state are periodically changed in response to the generation of the event signal.

Meanwhile, if usage of the CPU is higher than a certain value while the operation mode is periodically changed between the C0_Lo power state and the C4 or C6/7 power state, the operation mode returns to the C0 power state.

Figure 7:
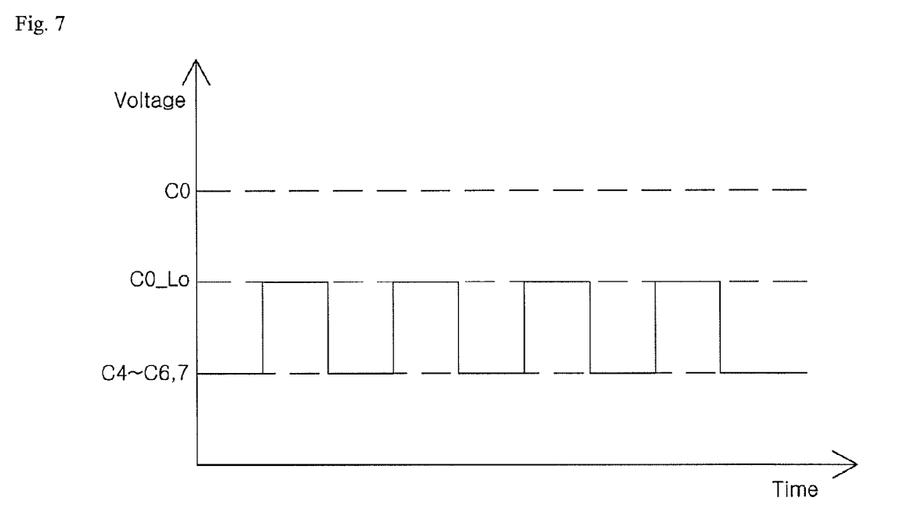
FIG. 7 is a graph showing relation of time and voltage when an operation mode of a processor is changed according to the noise reduction apparatus of a dynamic power management processor of the third embodiment of the present invention.

FIG. 7 is a graph showing relation of time and voltage when an operation mode of a processor is changed according to the noise reduction apparatus of a dynamic power management processor of the third embodiment of the present invention.

Referring to FIG. 7, if a periodic exit event is generated in the C4 or C6/7 power state, the operation mode of the processor 100 is periodically changed from the C4 or C6/7 power state to the C0_Lo power state in response to the generation of the event signal.

Here, since the C0_Lo power state operates at operation voltage lower than that of the C0 power state and higher than that of the C4 or C6/7 power state, the generation of noise can be prevented by reducing the extent of voltage variance according to the change in operation mode caused by the generation of the period event.

Hereinafter, preferred embodiments of a noise reduction method of a dynamic power management processor according to the present invention will be described in detail with reference to the accompanying drawings.

Figure 8:
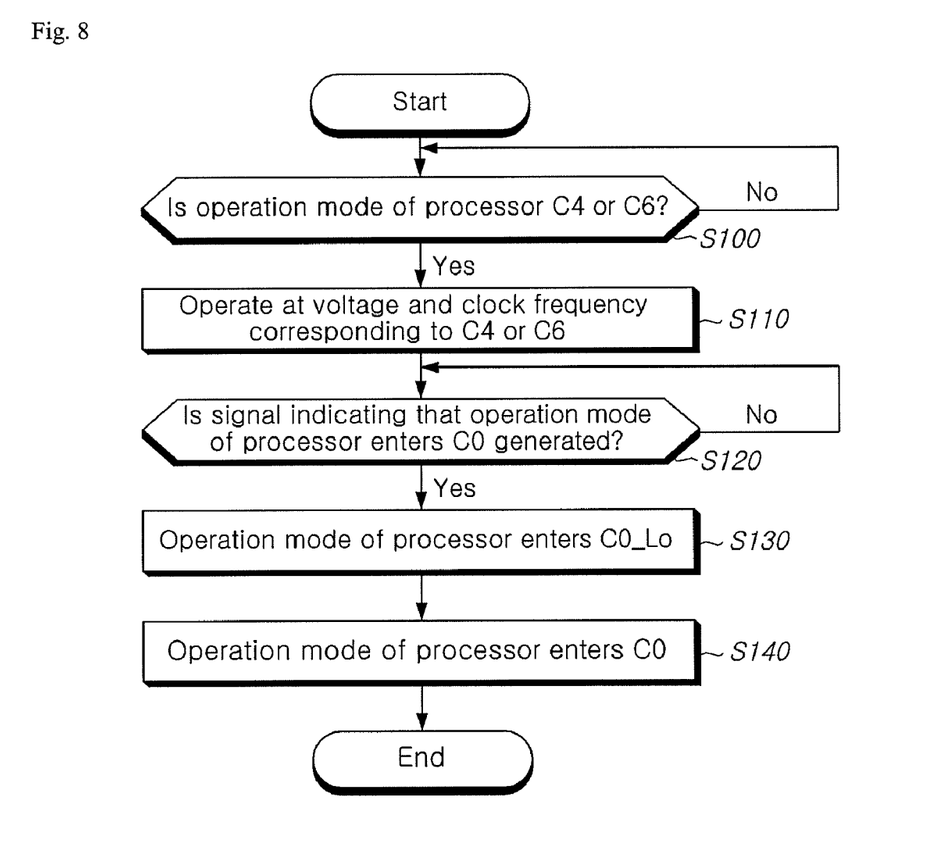
FIG. 8 is a flowchart specifically illustrating a noise reduction method of a dynamic power management processor according to the first embodiment of the present invention.

FIG. 8 is a flowchart specifically illustrating a noise reduction method of a dynamic power management processor according to the first embodiment of the present invention.

As shown in FIG. 8, the noise reduction method of a dynamic power management processor according to the first embodiment of the present invention starts from the step of determining whether the operation mode of the processor is in the C4 or C6 state (step S100).

At this time, step S110 is performed if the operation mode of the processor is in the C4 or C6 state, whereas step S100 is performed if the operation mode of the processor is not in the C4 or C6 state.

Here, the C4 or C6 state means a sleep mode in which activity of the processor is suspended.

Next, if the operation mode of the processor is in the C4 or C6 state as a result of the determination in step S100, the processor operates at voltage and clock frequency corresponding to the C4 or C6 state (step S110).

Subsequently, it is determined whether a signal indicating the operation mode of the processor to enter the C0 state is generated (step S120).

At this time, step S130 is performed if the signal indicating the operation mode of the processor to enter the C0 state is generated, whereas step S120 is performed if the signal indicating that the operation mode of the processor enters the C0 state is not generated.

Here, the C0 state means a general mode in which the processor operates normally.

Next, if the signal indicating the operation mode of the processor to enter the C0 state is generated as a result of the determination in step S120, the operation mode of the processor enters the C0_Lo state (step S130).

At this time, the C0_Lo power state is one of the low frequency modes. The low frequency mode represents a power state in which the processor operates at voltage and clock frequency lower than those of the general mode and higher than those of the sleep mode.

Here, the low frequency mode includes the super LFM and the ultra LFM as described above. In addition, the ultra LFM means the same state as the C0_Lo power state. That is, the operation mode of the processor can be set to the low frequency mode of the super LFM instead of entering the C0_Lo power state.

Subsequently, the operation mode of the processor enters the C0 state (step S140).

Here, since the low frequency mode is in a state operating at voltage and clock frequency lower than those of the general mode and higher than those the sleep mode, the generation of noise can be prevented by reducing the extent of voltage variance according to the change in operation mode.

That is, since the C0_Lo power state operates at operation voltage lower than that of the C0 power state and higher than that of the C4 or C6 power state, the generation of noise can be prevented by reducing the extent of voltage variance according to the change in operation mode.

Meanwhile, the noise reduction method of a dynamic power management processor according to the first embodiment of the present invention may apply the low frequency mode to all cases where the operation mode of the processor is changed between the general mode and the sleep mode. In addition, the operation mode of the processor can be set to be changed via the low frequency mode restrictively only when the change between the general mode and the sleep mode is performed by the event signal periodically generated.

In addition, although FIG. 8 shows only the process of changing the operation mode to the C0 state via the C0_Lo state when the operation mode of the processor is the C4 state or the C6 state, the step of setting the operation mode of the processor to the C0_Lo power state is performed even when the operation mode enters the C4 or C6 power state from the C0 power state, and thus, the generation of noise can be prevented by reducing the extent of voltage variance according to the change in operation mode.

However, since the step of entering the C4 or C6 power state from the C0 power state via the C0_Lo power state is similar to the change in operation mode of the processor described referring to FIG. 8, the detailed descriptions thereof will be omitted.

Figure 9:
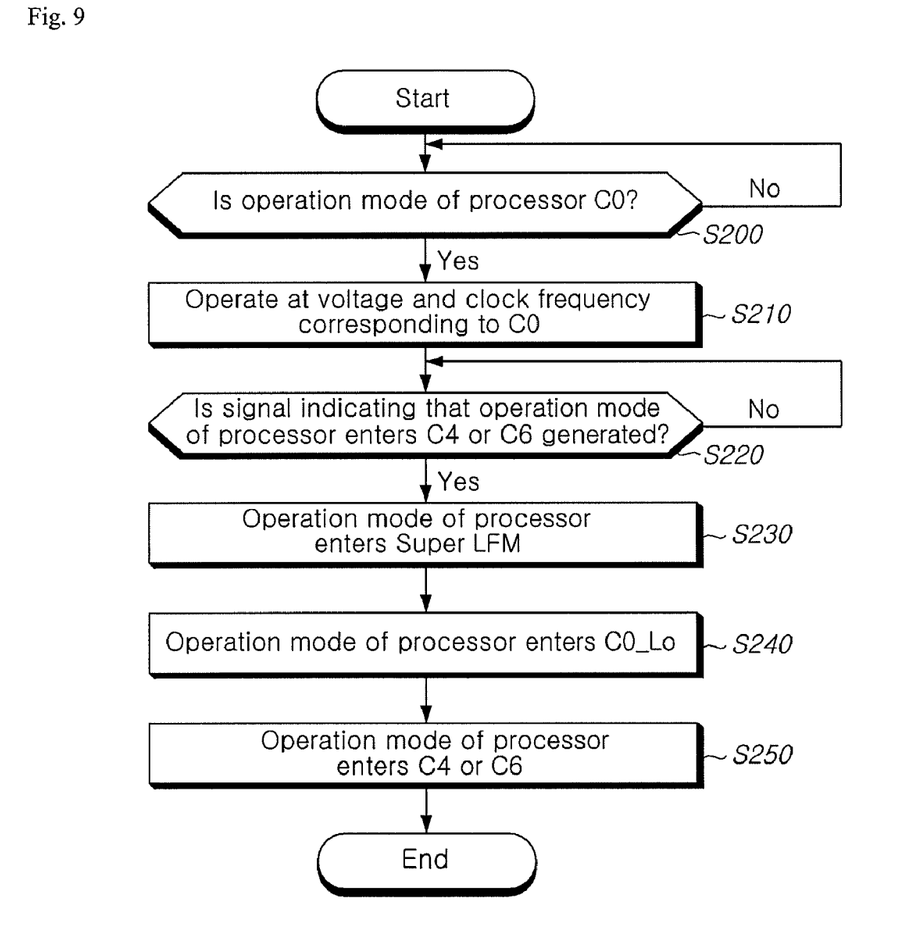
FIG. 9 is a flowchart specifically illustrating a noise reduction method of a dynamic power management processor according to the second embodiment of the present invention.

FIG. 9 is a flowchart specifically illustrating a noise reduction method of a dynamic power management processor according to the second embodiment of the present invention.

As shown in FIG. 9, the noise reduction method of a dynamic power management processor according to the second embodiment of the present invention starts from the step of determining whether the operation mode of the processor is in the C0 state (step S200).

At this time, step S210 is performed if the operation mode of the processor is in the C0 state, whereas step S200 is performed if the operation mode of the processor is not in the C0 state.

Next, if the operation mode of the processor is in the C0 state as a result of the determination in step S200, the processor operates at voltage and clock frequency corresponding to the C0 state (step S210).

Subsequently, it is determined whether a signal indicating the operation mode of the processor to enter the C4 or C6 state is generated (step S220).

At this time, step S230 is performed if a signal indicating the operation mode of the processor to enter the C4 or C6 state is generated, whereas step S220 is performed if the signal indicating the operation mode of the processor to enter the C4 or C6 state is not generated.

Next, if the signal indicating the operation mode of the processor to enter the C4 or C6 state is generated as a result of the determination in step S220, the operation mode of the processor enters the super LFM (step S230).

That is, when a signal of P_LVL4, P_LVL5/P_LVL6, or MWAIT (C4/C6) is received in the C0 power state, the operation mode of the processor enters the super LFM.

Here, the super LFM is a low speed mode among the low frequency modes.

The low frequency mode includes the low speed mode, in which the processor virtualizes a bus signal and operates at clock frequency and bus frequency lower than those of the general mode, and the ultra low speed mode, in which the processor operates at voltage and clock frequency lower than those of the low speed mode.

At this time, the low speed mode is a low frequency mode, in which the processor virtualizes a bus signal and operates at clock frequency and bus frequency lower than those of the general mode, while the ultra low speed mode is a low frequency mode, in which the processor operates at voltage and clock frequency lower than those of the low speed mode.

Subsequently, the operation mode of the processor enters the C0_Lo state (step S240).

Here, the C0_Lo state is an ultra low speed mode among the low frequency modes.

The ultra low speed mode is a state, in which a clock signal is received from the PLL or a bus signal is virtualized whereby the operation voltage and clock frequency of the processor are set to be lower than those of the low speed mode.

That is, the ultra low speed mode may be performed according to a first method, in which the PLL signals to reduce the output clock frequency thereby lowering the clock frequency of the processor and thus causing the processor to operate at low voltage.

In addition, the ultra low speed mode may also be performed according to a second method, by which both the clock frequencies of the processor and the FSB are flexibly lowered simultaneously using the dynamic FSB frequency switching technique. That is, the ultra low speed mode does not change an external bus signal (BCLK), but simultaneously lowers both the clock frequencies of the processor and the FSB in a method of virtualizing a bus signal by lowering reference frequency of the bus signal with respect to the external bus signal within the processor.

Further, the ultra low speed mode may be performed according to a method, by which the processor operates at voltage and clock frequency lower than those of the low speed mode by applying both the aforementioned first and second methods.

Next, the operation mode of the processor enters the C4 or C6 state (step S250).

Here, since the super LFM operates at operation voltage lower than that of the C0 power state and higher than that of the C0_Lo power state, and the C0_Lo power state operates at operation voltage lower than that of the super LFM and higher than that of the C4 or C6/7 power state, the generation of noise can be prevented by reducing the extent of voltage variance according to the change in operation mode of the process.

Meanwhile, in the same manner as described above, the noise reduction method of a dynamic power management processor according to the second embodiment of the present invention may set the operation mode to the low speed mode and the ultra low speed mode as an intermediate step of the operation mode change of the processor only when the change occurs between the general mode and the sleep mode according to the event signal periodically generated.

In the meantime, although FIG. 9 shows only the process of changing the operation mode to the C4 or C6 state via the super LFM and the C0_Lo state when the operation mode of the processor is the C0 state, the step of setting the operation mode of the processor to the C0_Lo power state and the super LFM is performed even when the operation mode enters the C0 power state from the C4 or C6 power state, and thus, the generation of noise can be prevented by reducing the extent of voltage variance according to the change in operation mode.

However, since the step of entering the C0 power state from the C4 or C6 power state via the power states C0_Lo power state and the super LFM is similar to the change of the operation mode of the processor described referring to FIG. 9, the detailed descriptions thereof will be omitted.

Figure 10:
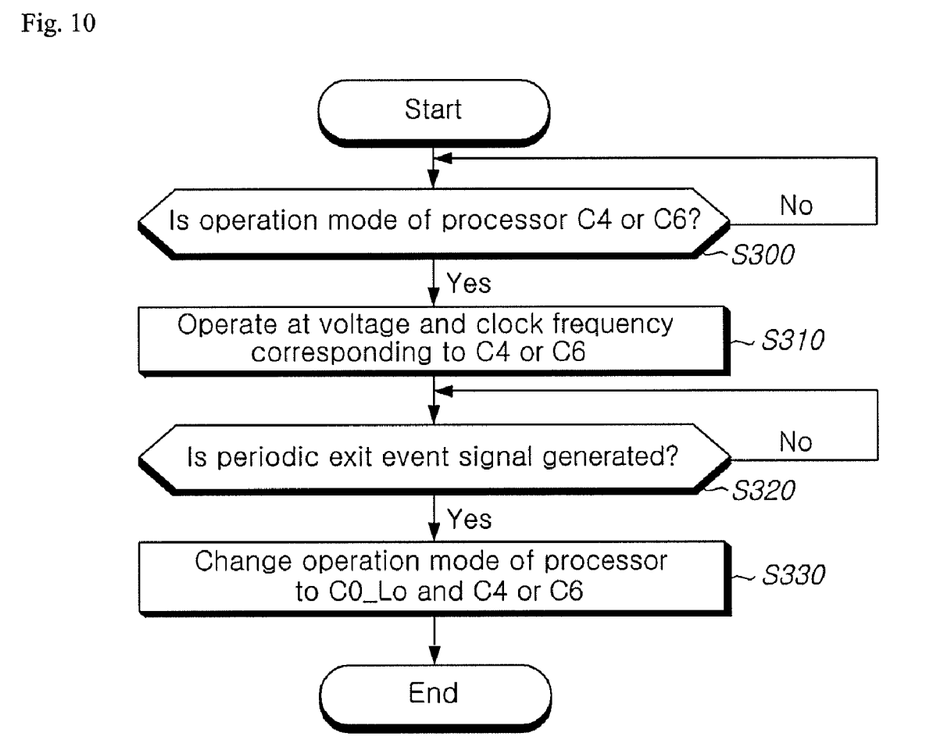
FIG. 10 is a flowchart specifically illustrating a noise reduction method of a dynamic power management processor according to the third embodiment of the present invention.

FIG. 10 is a flowchart specifically illustrating a noise reduction method of a dynamic power management processor according to the third embodiment of the present invention.

As shown in FIG. 10, the noise reduction method of a dynamic power management processor according to the third embodiment of the present invention starts from the step of determining whether the operation mode of the processor is in the C4 or C6 state (step S300).

At this time, step S310 is performed if the operation mode of the processor is in the C4 or C6 state, whereas step S300 is performed if the operation mode of the processor is not in the C4 or C6 state.

Next, if the operation mode of the processor is in the C4 or C6 state as a result of the determination in step S300, the processor operates at voltage and clock frequency corresponding to the C4 or C6 power state (step S310).

Subsequently, it is determined whether a periodic exit event signal is generated (step S320).

At this time, step S330 is performed if the periodic exit event signal is generated, whereas step S320 is performed if the periodic exit event signal is not generated.

Next, if the periodic exit event signal is generated as a result of the determination in step S320, the operation mode of the processor periodically changes to the C0_Lo state and the C4 or C6 state (step S330).

That is, if the periodic exit event is generated in the C4 or C6 power state, the operation mode of the processor periodically changes from the C4 or C6/7 power state to the C0_Lo power state in response to the generation of the event signal.

Here, since the C0_Lo power state operates at operation voltage lower than that of the C0 power state and higher than that of the C4 or C6/7 power state, the generation of noise can be prevented by reducing the extent of voltage variance according to the change in operation mode caused by the generation of the period event.

According to the noise reduction apparatus and method of a dynamic power management processor according to the present invention as described above, the following effects can be expected.

That is, noise generated by a capacitor resonance phenomenon of a DC/DC converter, which is a power input terminal, can be reduced in the C4 or C6 power state.

Furthermore, according to the present invention, the problem of an increase in manufacturing cost and enlargement of a computer occurring when a capacitor of the power input terminal of the CPU core is replaced with a Tantal capacitor.

The scope of the present invention is not limited to the embodiment described and illustrated above but is defined by the appended claims. It will be apparent that those skilled in the art can make various modifications and changes thereto within the scope of the invention defined by the claims.

What is claimed is:

1. A noise reduction apparatus of a dynamic power management processor, the apparatus comprising:
   a mode setting unit configured to detect a use state of a processor and to set an operation mode of the processor; and
   a power supply unit configured to supply a voltage corresponding to the operation mode set by the mode setting unit,
   wherein the mode setting unit is configured to change the operation mode of the processor periodically between a sleep mode and a low frequency mode in response to receiving a periodically generated signal during the sleep mode of the processor,
   wherein the low frequency mode includes a low frequency mode voltage and a low frequency mode clock frequency respectively lower than a general mode voltage and a general mode clock frequency and respectively higher than a sleep mode voltage and a sleep mode clock frequency, and
   wherein, if usage of the processor is higher than a certain value while the operation mode is periodically changed between the sleep mode and the low frequency mode, the operation mode returns to a general operation mode.

2. The noise reduction apparatus as claimed in claim 1, wherein the low frequency mode comprises:
   a low speed mode in which the processor virtualizes a bus signal by using a dynamic front side bus (FSB) frequency switching and operates at a low speed mode clock frequency and a low speed mode bus frequency, which are lower than the general mode clock frequency and a general mode bus frequency, and
   an ultra low speed mode in which the processor operates at an ultra low speed mode voltage and an ultra low speed mode clock frequency, which are lower than the low speed mode voltage and the low speed mode clock frequency.

3. The noise reduction apparatus as claimed in claim 2, wherein the ultra low speed mode includes controlling a PLL so that the ultra low speed mode voltage and the ultra low speed mode clock frequency of the processor are set to be lower than the low speed mode voltage and the low speed mode clock frequency.

4. The noise reduction apparatus as claimed in claim 2, wherein the ultra low speed mode includes virtualizing the bus signal by a dynamic front side bus (FSB) frequency switching so that the ultra low speed mode voltage and the ultra low speed mode clock frequency of the processor are set to be lower than the low speed mode voltage and the low speed mode clock frequency.

5. A noise reduction method of a dynamic power management processor by an apparatus, comprising the steps of:
   (A) detecting, by the apparatus, a use state of a processor and setting an operation mode of the processor;
   (B) setting, by the apparatus, the operation mode of the processor to a sleep mode in response to the detected use state of the processor;
   (C) changing the operation mode of the processor periodically between the sleep mode and a low frequency mode in response to receiving a periodically generated signal during the sleep mode of the processor; and
   (D) if usage of the processor is higher than a certain value while the operation mode is periodically changed between the sleep mode and the low frequency mode, returning the operation mode to a general operation mode by the apparatus,
   wherein the low frequency mode is a mode having at a low frequency mode voltage and a low frequency mode clock frequency respectively lower than a general mode voltage and a general mode clock frequency and respectively higher than a sleep mode voltage and a sleep mode clock frequency.

6. The noise reduction method as claimed in claim 5, wherein the low frequency mode comprises:
   a low speed mode in which the processor virtualizes a bus signal by using a dynamic front side bus (FSB) frequency switching and including a low speed mode clock frequency and a low speed mode bus frequency lower than the general mode clock frequency and the general mode bus frequency, and
   an ultra low speed mode in which the processor operates at an ultra low speed mode voltage and an ultra low speed mode clock frequency lower than the low speed mode voltage and the low speed mode clock frequency.

7. The noise reduction method as claimed in claim 6, wherein the ultra low speed mode includes controlling a PLL so that the ultra low speed mode voltage and the ultra low speed mode clock frequency of the processor are set to be lower than the low speed mode voltage and the low speed mode clock frequency.

8. The noise reduction method as claimed in claim 6, wherein the ultra low speed mode includes virtualizing the bus signal by a dynamic front side bus (FSB) frequency switching so that the ultra low speed mode voltage and the ultra low speed mode clock frequency of the processor are set to be lower than the low speed mode voltage and the low speed mode clock frequency.

* * * * *